(12) United States Patent
Darling

(10) Patent No.: US 12,531,254 B2
(45) Date of Patent: Jan. 20, 2026

(54) EMERGENCY POWER FUEL CELL WITH EVAPORATIVE COOLING

(71) Applicant: Hamilton Sundstrand Corporation, Charlotte, NC (US)

(72) Inventor: Robert M. Darling, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 520 days.

(21) Appl. No.: 18/080,022

(22) Filed: Dec. 13, 2022

(65) Prior Publication Data
US 2024/0194905 A1    Jun. 13, 2024

(51) Int. Cl.
*H01M 8/04007* (2016.01)
*B60L 50/70* (2019.01)
*B64D 27/24* (2024.01)
*H01M 8/04029* (2016.01)
(Continued)

(52) U.S. Cl.
CPC ......... *H01M 8/04059* (2013.01); *B60L 50/70* (2019.02); *B64D 27/24* (2013.01); *H01M 8/04029* (2013.01); *H01M 8/04201* (2013.01); *H01M 8/04768* (2013.01); *B60L 2200/10* (2013.01); *H01M 2250/20* (2013.01)

(58) Field of Classification Search
CPC ......... H01M 8/04007; H01M 8/04014; H01M 8/04029; H01M 8/04044; H01M 8/04059; H01M 8/04067; H01M 8/04074; H01M 8/04201; H01M 8/04358; H01M 8/04417; H01M 8/04485; H01M 8/04723; H01M 8/04768; H01M 8/04813; H01M 2250/20; B60L 50/70; B60L 50/71; B60L 50/72; B64D 27/355; B64D 2041/005
See application file for complete search history.

(56) References Cited

U.S. PATENT DOCUMENTS

| | | |
|---|---|---|
| 7,208,239 B2 | 4/2007 | Hoffjann et al. |
| 8,685,581 B2 | 4/2014 | Scheibert |
| 11,434,021 B2 | 9/2022 | Woodhouse et al. |

(Continued)

FOREIGN PATENT DOCUMENTS

| | | | |
|---|---|---|---|
| CN | 114899443 | * | 8/2022 |
| CN | 114899443 A | | 8/2022 |
| DE | 102021204962 A1 | | 1/2022 |

OTHER PUBLICATIONS

European Search Report for Application No. 23215363.5, mailed Feb. 6, 2025, 8 Pages.

*Primary Examiner* — Matthew W Van Oudenaren
(74) *Attorney, Agent, or Firm* — CANTOR COLBURN LLP

(57) ABSTRACT

The present disclosure provides for fuel cell systems, assemblies and methods. More particularly, the present disclosure provides for emergency power fuel cell systems, assemblies and methods (e.g., for aircraft or the like), with the fuel cells having indirect evaporative cooling. The present disclosure provides that a liquid-air heat exchanger that exchanges heat carried by hot coolant from a fuel cell with ambient air can be replaced by a heat exchanger that transfers heat from the fuel cell to grey water (e.g., grey water that is stored on an airplane or the like) that is allowed to evaporate. As such, this substantially eliminates the coolant fans, and can result in a smaller and/or lighter heat exchanger.

16 Claims, 2 Drawing Sheets

(51) Int. Cl.
  *H01M 8/04082* (2016.01)
  *H01M 8/04746* (2016.01)

(56) References Cited

U.S. PATENT DOCUMENTS

| | | | | |
|---|---|---|---|---|
| 2005/0249990 A1* | 11/2005 | Reiser | ............... | H01M 8/04097 |
| | | | | 429/444 |
| 2005/0271917 A1 | 12/2005 | Hoffjann et al. | | |
| 2008/0210812 A1* | 9/2008 | Gans | ................. | H01M 8/04731 |
| | | | | 244/58 |
| 2012/0077097 A1* | 3/2012 | Kokubu | ............ | H01M 8/04955 |
| | | | | 429/413 |

* cited by examiner

EMERGENCY POWER FUEL CELL WITH EVAPORATIVE COOLING

TECHNICAL FIELD

The present disclosure relates to fuel cell systems, assemblies and methods and, more particularly, to emergency power fuel cell systems, assemblies and methods (e.g., for aircraft or the like), with the fuel cells having indirect evaporative cooling.

BACKGROUND

In general, hydrogen/oxygen fuel cells can be used for emergency power on aircraft. For example, a fuel cell producing 30 kilowatts (kW) of power will produce about 20 KW of heat. The required heat exchanger and fans generally add mass and complexity to the system.

BRIEF DESCRIPTION

The present disclosure provides for fuel cell systems, assemblies and methods. More particularly, the present disclosure provides for emergency power fuel cell systems, assemblies and methods (e.g., for aircraft or the like), with the fuel cells having indirect evaporative cooling.

The present disclosure provides for a fuel cell assembly including an anode that is in fluid communication with a fuel; a cathode that is in fluid communication with an oxidizer; and wherein heat from the anode or the cathode is passed to a coolant, and the hot coolant is passed through or adjacent to an amount of grey water in a grey water tank to cool the coolant via evaporative cooling of the grey water; and wherein the grey water is stored or produced on an aircraft.

In addition to one or more of the features described, or as an alternative to any of the foregoing embodiments, the hot coolant is cooled without a radiator or a fan.

In addition to one or more of the features described, or as an alternative to any of the foregoing embodiments, the radiator is a liquid to ambient air heat exchanger.

In addition to one or more of the features described, or as an alternative to any of the foregoing embodiments, the fuel cell assembly is a hydrogen/oxygen fuel cell emergency power unit assembly onboard the aircraft.

In addition to one or more of the features described, or as an alternative to any of the foregoing embodiments, the fuel comprises hydrogen gas, and the oxidizer comprises oxygen.

In addition to one or more of the features described, or as an alternative to any of the foregoing embodiments, the hydrogen gas is stored on-board the aircraft in at least one hydrogen container for compressed hydrogen storage, and the oxygen is stored on-board the aircraft in at least one oxygen container for compressed oxygen storage.

In addition to one or more of the features described, or as an alternative to any of the foregoing embodiments, the fuel cell assembly delivers between 5 kW to 60 kW continuously during operation.

In addition to one or more of the features described, or as an alternative to any of the foregoing embodiments, the fuel cell assembly operates with greater than 95% fuel utilization, and with greater than 80% oxidizer utilization per pass.

In addition to one or more of the features described, or as an alternative to any of the foregoing embodiments, the cooled coolant is returned adjacent to the cathode or the anode via a pump for further cooling.

The present disclosure provides for a method for operating a fuel cell including providing an anode that is in fluid communication with a fuel; providing a cathode that is in fluid communication with an oxidizer; and passing heat from the anode or the cathode to a coolant; passing the hot coolant through or adjacent to an amount of grey water in a grey water tank to cool the coolant via evaporative cooling of the grey water; and wherein the grey water is stored or produced on an aircraft.

In addition to one or more of the features described, or as an alternative to any of the foregoing embodiments, the hot coolant is cooled without a radiator or a fan.

In addition to one or more of the features described, or as an alternative to any of the foregoing embodiments, the radiator is a liquid to ambient air heat exchanger.

In addition to one or more of the features described, or as an alternative to any of the foregoing embodiments, the fuel cell assembly is a hydrogen/oxygen fuel cell emergency power unit assembly onboard the aircraft.

In addition to one or more of the features described, or as an alternative to any of the foregoing embodiments, the fuel comprises hydrogen gas, and the oxidizer comprises oxygen.

In addition to one or more of the features described, or as an alternative to any of the foregoing embodiments, the hydrogen gas is stored on-board the aircraft in at least one hydrogen container for compressed hydrogen storage, and the oxygen is stored on-board the aircraft in at least one oxygen container for compressed oxygen storage.

In addition to one or more of the features described, or as an alternative to any of the foregoing embodiments, the fuel cell assembly delivers between 5 KW to 60 kW continuously during operation.

In addition to one or more of the features described, or as an alternative to any of the foregoing embodiments, the fuel cell assembly operates with greater than 95% fuel utilization, and with greater than 80% oxidizer utilization per pass.

In addition to one or more of the features described, or as an alternative to any of the foregoing embodiments, the cooled coolant is returned adjacent to the cathode or the anode via a pump for further cooling.

The above described and other features are exemplified by the following figures and detailed description.

Any combination or permutation of embodiments is envisioned. Additional features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are example embodiments wherein the like elements are numbered alike.

Features and aspects of embodiments are described below with reference to the accompanying drawings, in which elements are not necessarily depicted to scale.

Figure 1:
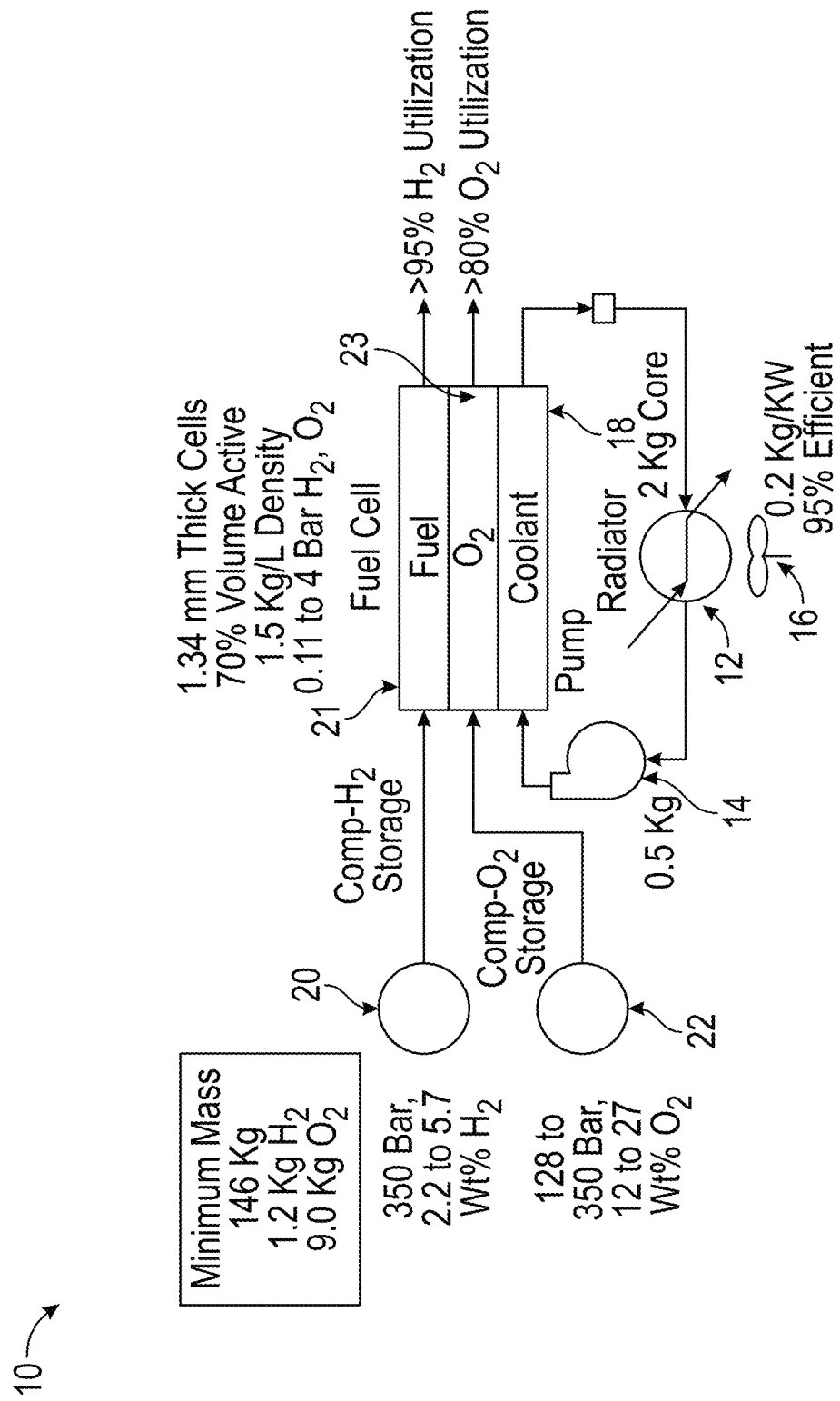

Example embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

FIG. 1 is a schematic of a fuel cell assembly; and

Figure 2:
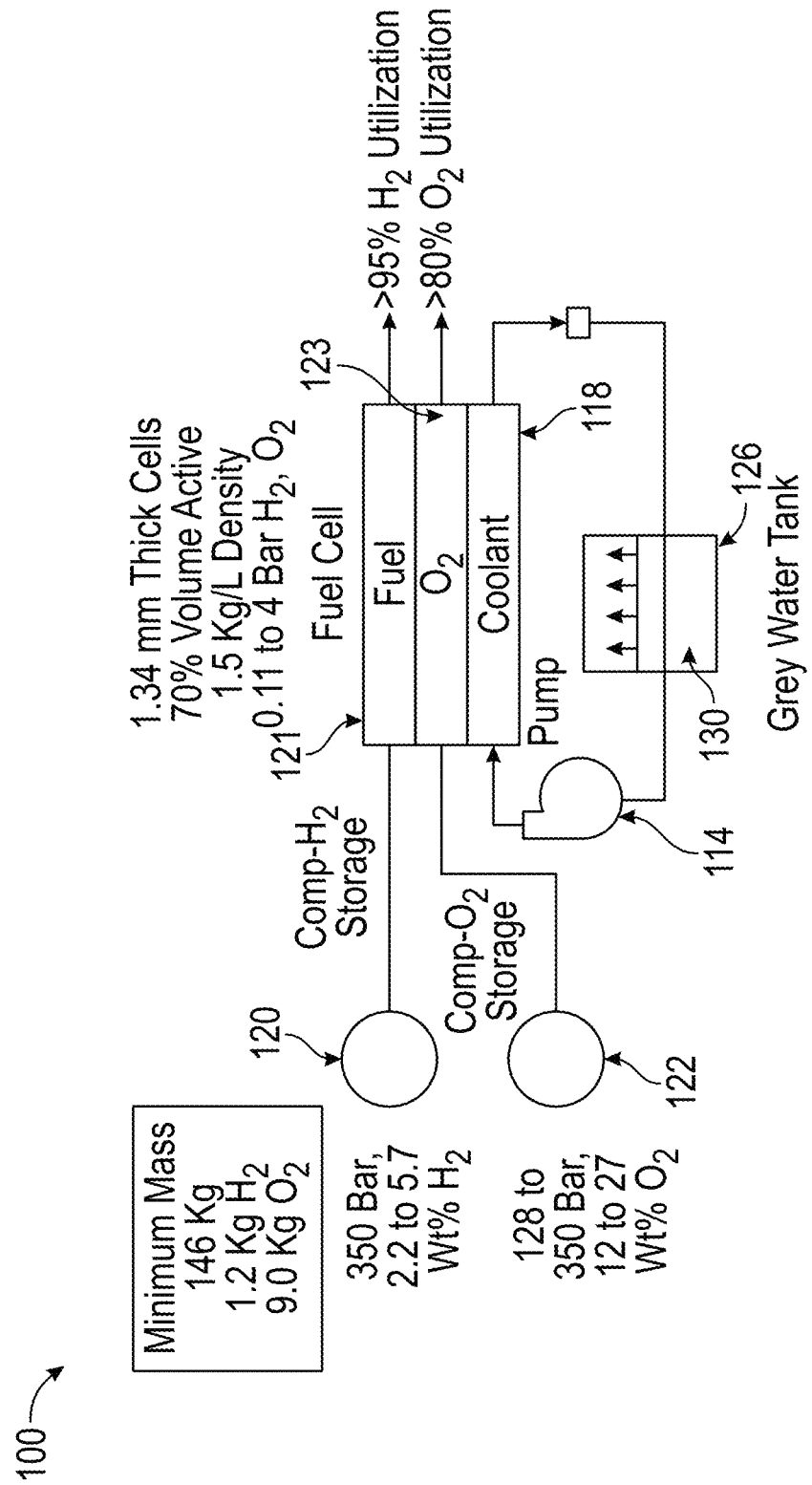

FIG. 2 is a schematic of an example fuel cell assembly, according to the present disclosure.

DETAILED DESCRIPTION

The example embodiments disclosed herein are illustrative of fuel cell systems, and assemblies of the present disclosure and methods/techniques thereof. It should be understood, however, that the disclosed embodiments are merely examples of the present disclosure, which may be embodied in various forms. Therefore, details disclosed herein with reference to example fuel cell systems and associated processes/techniques of fabrication/assembly and use are not to be interpreted as limiting, but merely as the basis for teaching one skilled in the art how to make and use the systems/assemblies and/or alternative systems/assemblies of the present disclosure.

The present disclosure provides for fuel cell systems, assemblies and methods. More particularly, the present disclosure provides for emergency power fuel cell systems, assemblies and methods (e.g., for aircraft or the like), with the fuel cells having indirect evaporative cooling. It is noted that the fuel cell itself is sensibly cooled and the fuel cell has a coolant line that is coupled to a grey water tank that is cooled via evaporative cooling of the grey water in the grey water tank, as discussed further below (FIG. 2).

In example embodiments, the present disclosure provides that a liquid-air heat exchanger that exchanges heat carried by hot coolant from a fuel cell with ambient air can be replaced by a heat exchanger that transfers heat from the fuel cell to grey water (e.g., grey water that is stored on an airplane or the like) that is allowed to evaporate. As such, this substantially eliminates the coolant fans, and can result in a smaller and/or lighter heat exchanger.

FIG. 1 is a schematic of a fuel cell assembly 10. In general, fuel cell assembly 10 is a hydrogen/oxygen fuel cell emergency power unit (EPU) assembly 10 for aviation, and FIG. 1 depicts the mechanical balance of plant for the fuel cell EPU assembly 10.

As shown in FIG. 1, the fuel cell EPU assembly 10 can be designed to deliver 30 kW continuously, or between 5 to 60 kW continuously, and can have an estimated mass of 146 kilograms (kg) for a 60 minute mission (and approximately 1.2 kg $H_2$ and 9.0 kg $O_2$).

The fuel cell EPU assembly 10 in FIG. 1 can include a dedicated radiator 12, pump 14, fan 16 and coolant 18 to reject approximately 20 KW of heat to ambient air. As shown in FIG. 1, the liquid-air heat exchanger (radiator 12, fan 16, coolant 18) exchanges heat carried by the hot coolant 18 (e.g., heat from the cathode 23 and/or the anode 21 of the fuel cell assembly 10) with ambient air via fan 16 and radiator 12 for cooling purposes of coolant 18. The cooled coolant 18 is then returned adjacent to the cathode 23 and/or the anode 21 via pump 14 for further cooling.

The fuel cell EPU assembly 10 can also include a hydrogen ($H_2$) supply container 20 for compressed hydrogen storage (e.g, 350 bar, 2.2 to 5.7 weight % $H_2$) and to supply $H_2$ fuel to the anode 21 of the assembly 10, and an oxygen ($O_2$) supply container 22 for compressed oxygen storage (e.g, 128 bar, 12 weight % $O_2$ to 350 bar (5000 psi), 27 weight % $O_2$) and to supply $O_2$ (oxidizer) to the cathode 23 of the assembly 10.

At the anode 21 the hydrogen gas is electrochemically disassociated (in the presence of a catalyst) into protons (e.g., $H^+$) and free electrons (e).

The anode reaction is: $2H_2 \rightarrow 4H^+ + 4e^-$

The electrons can flow out of the anode 21 through an external electrical circuit.

The hydrogen ions can flow into an electrolyte layer of the assembly 10 and eventually to the cathode 23, driven by both concentration and electrical forces.

At the cathode 23, the oxygen ($O_2$) gas is electrochemically combined (in the presence of a catalyst) with the hydrogen ions ($H^+$) and free electrons ($e^-$) to generate water ($H_2O$).

The cathode reaction is: $O_2 + 4H^+ + 4e^- \rightarrow 2H_2O$

The overall (net fuel cell) reaction in fuel cell assembly 10 is: $2H_2 + O_2 \rightarrow 2H_2O$ (liquid and vapor)+Work+Heat The fuel cell assembly 10 can operate with greater than 95% $H_2$ utilization, and with greater than 80% $O_2$ utilization per pass.

The anode 21 and cathode 23 together with the membrane separator, gas diffusion layers, and bipolar plates of assembly 10 can be unitized to form approximately 1.34 mm thick cells, with 70% volume active, and 1.5 kg/L average density, and can be operated at absolute pressures ranging from approximately 0.11 bar to 4 bar for the $H_2$ and the $O_2$.

FIG. 2 is a schematic of an example fuel cell assembly 100, according to the present disclosure.

In general, fuel cell assembly 100 is a hydrogen/oxygen fuel cell emergency power unit (EPU) assembly 100 for aviation (e.g., onboard an aircraft or the like). FIG. 2 depicts the mechanical balance of plant for the fuel cell EPU assembly 100.

As shown in FIG. 2, the fuel cell EPU assembly 100 can be designed to deliver 30 kW continuously, or between 5 to 60 kW continuously, and can have an estimated mass of 146 kilograms (kg) for a 60 minute mission (and approximately 1.2 kg $H_2$ and 9.0 kg $O_2$).

The fuel cell EPU assembly 100 can also include a hydrogen ($H_2$) supply container 120 for compressed hydrogen storage (e.g, 350 bar, 2.2 to 5.7 weight % $H_2$) and to supply $H_2$ fuel to the anode 121 of the assembly 100, and an oxygen ($O_2$) supply container 122 for compressed oxygen storage (128 bar, 12 weight % $O_2$ to 350 bar (5000 psi), 27 weight % $O_2$) and to supply $O_2$ (oxidizer) to the cathode 123 of the assembly 100.

At the anode 121 the hydrogen gas is electrochemically disassociated (in the presence of a catalyst) into protons (e.g., $H^+$) and free electrons (e).

The anode reaction is: $2H_2 \rightarrow 4H^+ + 4e^-$

The electrons can flow out of the anode 121 through an external electrical circuit.

The hydrogen ions can flow into an electrolyte layer of the assembly 100 and eventually to the cathode 123, driven by both concentration and electrical forces.

At the cathode 123, the oxygen ($O_2$) gas is electrochemically combined (in the presence of a catalyst) with the hydrogen ions ($H^+$) and free electrons ($e^-$) to generate water ($H_2O$).

The cathode reaction is: $O_2 + 4H^+ + 4e^- \rightarrow 2H_2O$

The overall (net fuel cell) reaction in fuel cell assembly 100 is: $2H_2 + O_2 \rightarrow 2H_2O$ (liquid and vapor)+Work+Heat The fuel cell assembly 100 can operate with greater than 95% $H_2$ utilization, and with greater than 80% $O_2$ utilization per pass.

The anode 121 and cathode 123 together with the membrane separator, gas diffusion layers, and bipolar plates of assembly 100 can be unitized to form approximately 1.34 mm thick cells, with 70% volume active, and 1.5 kg/L average density, and can be operated at absolute pressures ranging from approximately 0.11 bar to 4 bar for the $H_2$ and the $O_2$.

FIG. 2 shows a fuel cell EPU assembly 100 where heat from the anode 121 and/or from the cathode 123 of assembly 100 is removed by evaporating grey water 130 on board the aircraft instead of using a dedicated radiator 12, with the grey water 130 stored in grey water tank 126. This eliminates the liquid/air heat exchanger 12 and the air fan 16. As shown in FIG. 2, the grey water 130 stored in the tank 126 exchanges heat carried by the hot coolant 118 (e.g., heat from the cathode 123 and/or the anode 121 of the fuel cell assembly 100) by passing the hot coolant 118 through or adjacent to the grey water 130 in tank 126 for cooling purposes of coolant 118 via evaporative cooling of grey water 130. The cooled coolant 118 is then returned adjacent to the cathode 23 and/or the anode 21 via pump 114 for further cooling.

As such, assembly 100 provides that a liquid-air heat exchanger (e.g., radiator 12 and fan 16) that exchanges heat carried by hot coolant (18) from a fuel cell (10) with ambient air can be replaced by a heat exchanger (e.g., grey water tank 126 and grey water 130) that transfers heat from the fuel cell 100 to the grey water 130 that is allowed to evaporate for cooling purposes (e.g., grey water 130 that is produced, utilized and/or stored on an airplane or the like). As such, assembly 100 substantially eliminates the coolant fans (16) and the like, and can result in a smaller and/or lighter heat exchanger 126 with grey water 130.

In example embodiments, the grey water 130 is wastewater generated on an airplane or aircraft or the like, and comes from streams without fecal contamination (all streams except for the wastewater from toilets).

In an Example embodiment, Table 1 below shows the mass of grey water 130 that needs to be evaporated versus mission time. In an example embodiment, an A320 aircraft carries about 200 liters of potable water. As such, assembly 100 can be utilized for shorter mission times.

TABLE 1

Mass of grey water evaporated versus aircraft mission time

| Mission Time (min.) | Mass (kg) of grey water evaporated |
|---|---|
| 40 | 21 |
| 60 | 32 |
| 300 | 159 |
| 540 | 287 |

There are many benefits of the systems, assemblies and methods of the present disclosure, including, without limitation, lighter emergency power fuel cell systems, assemblies and methods for aviation.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the systems and methods of the present disclosure have been described with reference to example embodiments thereof, the present disclosure is not limited to such example embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A fuel cell assembly comprising:
   an anode that is in fluid communication with a fuel;
   a cathode that is in fluid communication with an oxidizer; and
   wherein heat from the anode or the cathode is passed to a coolant to create hot coolant, and the hot coolant is passed through or adjacent to an amount of grey water in a grey water tank to cool the coolant via evaporative cooling of the grey water; and
   wherein the grey water is stored or produced on an aircraft;
   wherein the fuel cell assembly is configured to cool the hot coolant without a radiator or a fan.

2. The fuel cell assembly of claim 1, wherein the radiator is a liquid to ambient air heat exchanger.

3. The fuel cell assembly of claim 1, wherein the fuel cell assembly is a hydrogen/oxygen fuel cell emergency power unit assembly onboard the aircraft.

4. The fuel cell assembly of claim 1, wherein the fuel comprises hydrogen gas, and the oxidizer comprises oxygen.

5. The fuel cell assembly of claim 4, wherein the hydrogen gas is stored on-board the aircraft in at least one hydrogen container for compressed hydrogen storage, and the oxygen is stored on-board the aircraft in at least one oxygen container for compressed oxygen storage.

6. The fuel cell assembly of claim 1, wherein the fuel cell assembly delivers between 5 kW to 60 kW continuously during operation.

7. The fuel cell assembly of claim 1, wherein the fuel cell assembly operates with greater than 95% fuel utilization, and with greater than 80% oxidizer utilization per pass.

8. The fuel cell assembly of claim 1, wherein cooled coolant is returned adjacent to the cathode or the anode via a pump for further cooling.

9. A method for operating a fuel cell assembly as recited in claim 1, the method comprising: providing the anode that is in fluid communication with a fuel;
    providing the cathode that is in fluid communication with an oxidizer; and
    passing heat from the anode or the cathode to the coolant to create the hot coolant; and
    passing the hot coolant through or adjacent to the amount of grey water in the grey water tank to cool the coolant via evaporative cooling of the grey water; and
    wherein the grey water is stored or produced on an aircraft.

10. The method of claim 9, wherein the radiator is a liquid to ambient air heat exchanger.

11. The method of claim 9, wherein the fuel cell assembly is a hydrogen/oxygen fuel cell emergency power unit assembly onboard the aircraft.

12. The method of claim 9, wherein the fuel comprises hydrogen gas, and the oxidizer comprises oxygen.

13. The method of claim 12, wherein the hydrogen gas is stored on-board the aircraft in at least one hydrogen container for compressed hydrogen storage, and the oxygen is stored on-board the aircraft in at least one oxygen container for compressed oxygen storage.

14. The method of claim 9, wherein the fuel cell assembly delivers between 5 kW to 60 kW continuously during operation.

15. The method of claim 9, wherein the fuel cell assembly operates with greater than 95% fuel utilization, and with greater than 80% oxidizer utilization per pass.

16. The method of claim 9, wherein the cooled coolant is returned adjacent to the cathode or the anode via a pump for further cooling.

* * * * *